United States Patent [19]

Possati et al.

[11] Patent Number: 4,625,413

[45] Date of Patent: Dec. 2, 1986

[54] HEAD FOR CHECKING DIMENSIONS OF MECHANICAL PARTS

[75] Inventors: Mario Possati, Bologna; Carlo Dall'Aglio, Volta Reno D1 Argelato, both of Italy

[73] Assignee: Finike Italiana Marposs S.p.A., S. Marino di Bentivoglio, Italy

[21] Appl. No.: 784,310

[22] Filed: Oct. 4, 1985

[30] Foreign Application Priority Data

Oct. 15, 1984 [IT] Italy .................................. 3603 A/84

[51] Int. Cl.⁴ .............................................. G01B 7/12
[52] U.S. Cl. .................................. 33/143 L; 33/149 J; 33/551; 33/178 E
[58] Field of Search .............. 33/143 L, 147 N, 149 J, 33/147 K, 551, 178 E

[56] References Cited

U.S. PATENT DOCUMENTS

| | | | |
|---|---|---|---|
| 4,355,467 | 10/1982 | Albertazzi | 33/143 L |
| 4,385,444 | 5/1983 | Possati et al. | 33/143 L |
| 4,386,467 | 6/1983 | Possati et al. | 33/143 L |
| 4,409,737 | 10/1983 | Golinelli | 33/172 E |
| 4,447,960 | 5/1984 | Golinelli et al. | 33/147 K |
| 4,524,523 | 6/1985 | Golinelli et al. | 33/143 L |

FOREIGN PATENT DOCUMENTS 2129133  5/1984  United Kingdom .

*Primary Examiner*—Willis Little
*Attorney, Agent, or Firm*—Stevens, Davis, Miller & Mosher

[57] ABSTRACT

A measuring head comprises an integral member defining a support portion, a plurality of fulcrums and a corresponding plurality of movable arms carrying feelers. The fulcrums are aligned for defining a single axis of rotation for the movable arms. Position transducers electrically detect the positions of the movable arms. Two measuring heads are employed for realizing a snap gauge for simultaneously checking a plurality of diameters.

17 Claims, 6 Drawing Figures

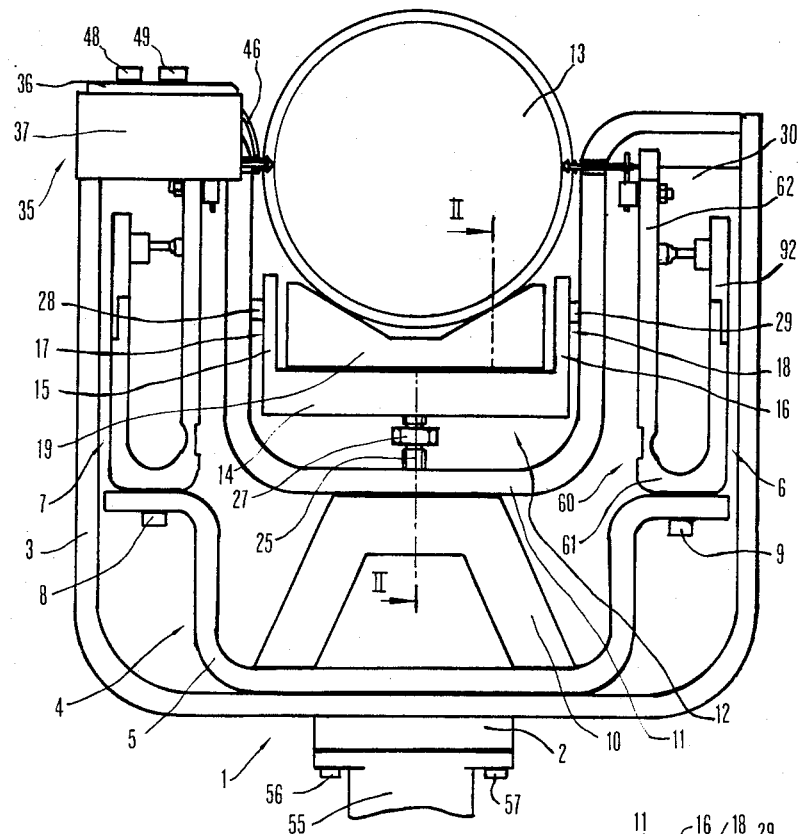
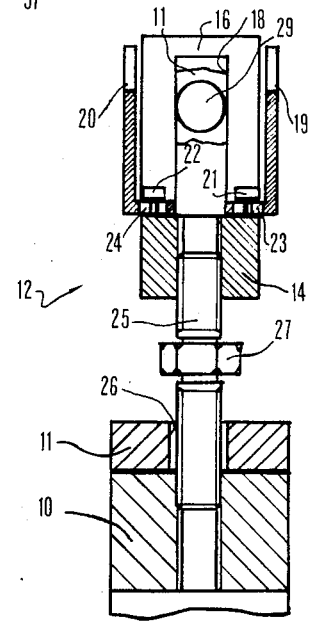
FIG. 1
FIG. 2

HEAD FOR CHECKING DIMENSIONS OF MECHANICAL PARTS

BACKGROUND OF THE INVENTION

1. Field of the Invention

The present invention relates to a head for checking dimensions of mechanical parts including feeling devices adapted to contact the part to be checked; an integral member defining a support portion, a plurality of movable supports for the feeling devices, and a plurality of portions having a lightened section for permitting rotational movements of the feeling devices with respect to the support portion; and detecting devices for generating signals responsive to said movements. The present invention has particular applicability to snap gauges for checking a plurality of diameters.

2. Description of the Prior Art.

From U.S. Pat. No. 4,409,737, devices, or measuring cells are known that basically comprise an integral element with a first portion, a second portion—movable with respect to the first portion—carrying a feeler, and a third portion that couples the first portion to the second portion and permits the movement of the second portion. The device also comprises transducer means that transform the feeler movements into electrical signals.

Cells of this type can be used for simultaneous measurements of several dimensions, for applications in measuring benches, or in other types of apparatuses.

For example a known gauge, of the type called "snap" gauge, that is used for checking radial dimensions of shafts, substantially comprises an element for positioning and supporting the part to be checked and a support onto which are fixed six measuring cells, arranged three by three side by side and in diametrally opposite positions with respect to the part axis. Since diametral dimensions of the same shaft have to be checked, it is important that the position of the measuring devices be very accurate. Therefore, the three cells arranged side by side must permit rotational displacements of the relevant feelers about axes that should be exactly parallel, or rather, coinciding. Consequently, it is understood that the operation for assembling the gauge requires high skill and care and involves a considerable amount of time.

In the prior art it has been suggested to make measuring devices, or similar devices, comprising an integral member defining a plurality of fulcrums for a measuring arm. For example, British patent application No. 2129133 shows a contact-detecting head with an integral member having a first portion carrying a movable arm, a second portion secured to a support, at least a third intermediate portion and portions having a reduced thickness that connect the first and second portion to the third portion, while defining rotation axes for mutual displacements of the different portions. The movable arm carries a feeler that moves together with the arm itself and switching elements are arranged between the portions for detecting the arm movement caused by the contact of the feeler against a part to be checked. The particular structure of the integral member permits movements of the feeler along at least two directions. However, the operation and purpose of the device described in British patent application No. 2129133 are completely different from the operation and purpose of the present invention.

SUMMARY OF THE INVENTION

An object of the present invention is to provide a head for checking dimensions of mechanical parts along a determined direction. More particularly, an object of the present invention is to provide a head for simultaneously checking a plurality, that allows a better accuracy with respect to the conventional devices and that, moreover, allows simpler and faster assembling operations.

In accordance with one aspect of the present invention, an accurate and reliable multiple cell is provided for applications in gauges for checking a plurality of dimensions, e.g. diametral dimensions. The cell comprises an integral member defining a support portion, a plurality of fulcrums and a corresponding plurality of movable arms. Feelers for contacting the part to be checked are fixed to the movable arms and the fulcrums are aligned for defining a single axis or rotation for the movable arms.

By using this cell the following main advantages are obtained: the operations for assembling heads to be used for simultaneously checking a plurality of dimensions are considerably simplified, since it is not necessary any more to align with the utmost accuracy several devices and secure them separately; the alignment takes place automatically during the machining operation of the cell, when obtaining the fulcrums; and the costs for producing a single arm-set, with multiple movable portions, turn out to be lower than those necessary for manufacturing several separate arm-sets.

Thus, the main advantages offered by the present invention reside in a considerable reduction of time and expenses for assembling apparatuses for dimensional checking, the relevant operation not requiring skilled personnel for obtaining the necessary accuracy. A further advantage resides in the greater sturdiness of the checking system, due to its compactness.

Another object of the present invention is to provide a flexible head, with a modular structure, that features a cheap basic block and replaceable additional elements.

Another object is to provide a mechanism for adjusting the position of the feelers, that is practical and flexible.

A further object is to obtain a snap-type gauge for several diametral dimensions, that is reliable, easy to use, sturdy, cheap and flexible.

A snap gauge according to the present invention comprises support means carrying reference means adapted to cooperate with the part to be checked and measuring means fixed to the support means. The measuring means include at least one measuring cell featuring a single block of material defining a plurality of measuring arms and relevant fulcrums. The fulcrums are aligned along a single axis and the measuring arms are movable about the relevant fulcrums independently from one another.

BRIEF DESCRIPTION OF THE DRAWINGS

The invention shall now be described in detail, with reference to the annexed drawings, given for exemplary and non-limiting purpose only, wherein:

FIG. 1 is a side view, with some details omitted for more clarity, of a snap-type gauge, including devices for dimensional checking, according to a preferred embodiment of the invention;

FIG. 2 is an enlarged section of the support and positioning device of FIG. 1, along the path II—II of FIG. 1;

DESCRIPTION OF THE PREFERRED EMBODIMENTS

Figure 3:
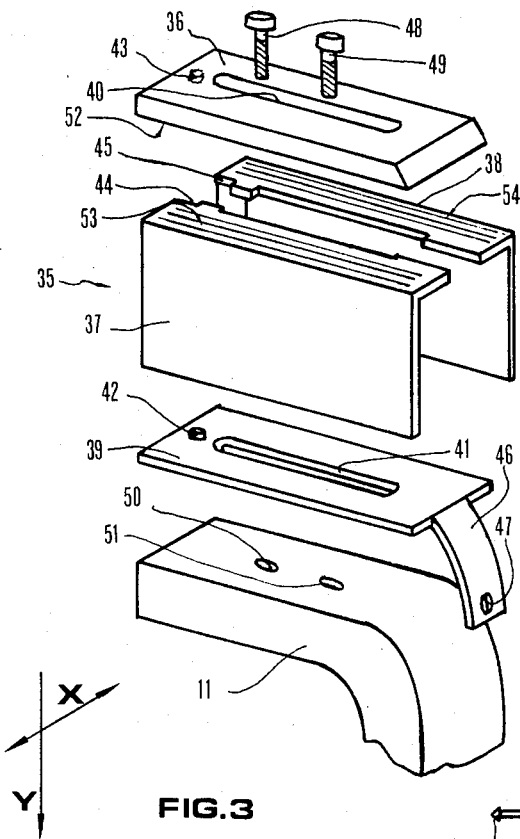
FIG. 3 is an enlarged exploded view of a detail of FIG. 1.

As shown in FIG. 1, the arm-set 4 of the gauge is fixed, in a way not shown in the drawing, to support and protection means 1 having a support portion 2 and a first element 3 for external protection.

The arm-set 4 comprises a first support member 5, substantially U-shaped with the ends bent outwardly, that supports, in correspondence with said ends, two measuring or gauging heads 6 and 7, fixed by means of pairs of screws 8 and 9. Each of the heads 6 and 7 has three movable arms with relevant feelers, as shall be more detailedly described hereinafter.

A second "bridge" shaped support member 10, with the ends fixed to support portion 2 by screws not shown in the drawing, supports a second element 11, for internal protection, it too being U-shaped with the ends bent outwardly.

Positioning means comprise a Vee reference device 12, for a part to be checked 13 of the type with rotational symmetry; the Vee device 12 is adjustably secured to the second support member 10 and defines a longitudinal geometric axis.

As visibly better in FIG. 2, device 12 comprises a small block 14, with two side wings 15, 16 defining relevant longitudinal openings 17, 18. Two separate V-shaped elements 19 and 20, with L-shaped cross-section, are secured to the upper surface of block 14 through adjusting means comprising pairs of screws 21 and 22 (only one screw of each pair is visible in FIG. 2) that pass through the V-shaped elements by way of slots 23 and 24 and are tightened into threaded holes, not visible in the drawing, of block 14. The whole device 12 is supported by connection means comprising a threaded pin 25, that is engaged through a right-hand thread and a left-hand thread, respectively, into holes obtained in the second support member 10 and in block 14, and passes freely through a through hole 26 of element 11.

A nut 27 is secured to the central section of pin 25 for enabling an operator to rotate, by means of a key, pin 25 about its axis (coinciding with the longitudinal axis of the gauge). In order to prevent casual rotations, the couplings of pin 25 with member 10 and block 14 also include self-locking thread inserts, not shown.

Two guide elements 28 and 29 are internally fixed to the legs of the U of protection element 11 and are engaged within longitudinal openings 17 and 18 of wings 15, 16.

The rotation of pin 25 causes longitudinal translations of block 14 since, due to the action of guide elements 28 and 29 within openings 17 and 18, block 14 cannot rotate with pin 25.

Thus, it is possible to adjust the longitudinal position of reference device 12, for adapting the gauge to check parts 13 having different nominal diametral dimensions.

Moreover, the presence of slots 23, 24, through which V-shaped elements 19 and 20 are fixed, permits adjustment of the mutual distance between the same elements 19 and 20, enabling adaptation of the supporting surface of device 12 to parts 13 of different dimensions.

A third and a fourth side protection element, flat and U-shaped—only one of which, 30, is visible in FIG. 1—are fixed to the first element for external protection 3 and are screwed to member 10 and element 11 in a way not shown in the figure.

Protection element 30 has substantially the shape of a half-shell that, together with the other side protection element (which in FIG. 1 is removed in order to show the inside of the gauge), provides a closure cover.

Two guide and protection devices, only one of which, 35, is visible in FIG. 1 and FIG. 3, are fixed to element 11 next to the bent ends of the U.

Device 35 has four distinct parts: an upper part 36 with a first slot 40, two intermediate parts 37 and 38 and a lower part 39 with a second slot 41, slots 40 and 41 defining a radial direction.

Moreover, part 39 has an abutment 42 adapted to cooperate with a seat 43 obtained in part 36, through a passage defined by two openings 44, 45 in intermediate parts 37 and 38, for determining the mutual positions of said four parts along the radial direction.

A protective extension 46 of part 39 has a hole 47 for the passage of a central feeler of head 7.

Fastening means comprise two clamping elements or screws 48 and 49, that—through slots 40 and 41—are engaged into relevant threaded holes 50 and 51 defined in element 11.

Moreover, the fastening means comprise a first fixing surface, constituted by the lower surface 52 of part 36, and second fixing surfaces constituted by the upper surfaces 53 and 54 of parts 37 and 38, respectively; portions of these surfaces 52, 53, 54 are machined so as to define grooved scores parallel to the radial direction.

Parts 36, 37, 38 and 39 are assembled along direction Y of FIG. 3 and secured to element 11.

Intermediate parts 37 and 38 are clamped between part 36 and part 39. In particular, surface 52 abuts against surfaces 53 and 54, and the shape of these surfaces causes the mutual position of the intermediate parts 37, 38 along the transversal direction X of FIG. 3 to be stably defined. The position of the whole device 35 along the radial direction defined by slots 40 and 41 is adjustable because screws 48 and 49 may slide within slots 40 and 41, aligned along direction Y.

Thus, screws 48 and 49 constitute fastening means adapted to contemporaneously determine the radial position of guide and protection device 35 and the transversal dimensions of the same device 35, depending on the transversal position of the feelers. of the head 7, the latter position being adjustable, as will be described herebelow.

A handle 55 is fixed to support portion 2 by screws 56 and 57.

Figure 4:
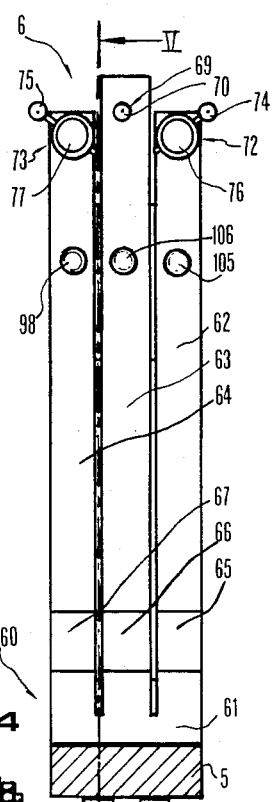
FIG. 4 is an enlarged elevation view of a measuring head of the gauge of FIG. 1.
Figure 5:
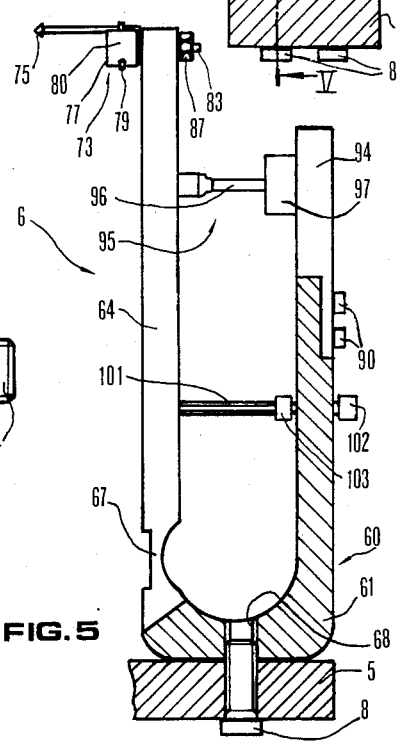
FIG. 5 is a section of the head of FIG. 4, along the path V—V of FIG. 4.

FIGS. 4 and 5 show in detail a measuring head, particularly, for example, head 6 of FIG. 1.

Head 6 comprises substantially an integral member 60, made of steel, that has a support portion 61, three movable arms 62, 63 and 64 that—in rest condition—define three parallel and coplanar longitudinal axes and three portions 65, 66 and 67 having resiliently flexible lightened sections, that connect said movable arms, respectively 62, 63, 64, to support portion 61. The lightened sections of portions 65, 66 and 67 constitute fulcrums of rotation for the movable arms and, in particular, are aligned so as to define a sole axis of rotation for all three movable arms 62, 63, 64. Support portion 61 defines a pair of threaded holes 68, only one of which is visible in FIG. 5, into which the pair of screws 8 is engaged, for securing the whole head 6 to member 5, in such a way that the axis of rotation of the movable arms 62–64 is exactly perpendicular to the plane of FIG. 1, and therefore parallel to the longitudinal axis of the part to be checked 13.

Integral member 60 has substantially a U-shape, one leg and the base of the U defining support portion 61 and the second leg of the U having a plurality of cuts for defining movable arms 62–64. The second leg of the U also includes resiliently flexible portions 65–67, that are separated from one another by said cuts, in order to permit independent movements of movable arms 62–64.

The intermediate arm 63 has longitudinal dimensions longer than side arms 62 and 64 and defines, next to the free end, a threaded hole 69 adapted to cooperate with a threaded feeler 70 that, accordingly, is coupled to arm 63—by means of a self-locking thread insert, not visible in the drawing—so as to be adjustable along the direction perpendicular to the plane of FIG. 4.

Figure 6:
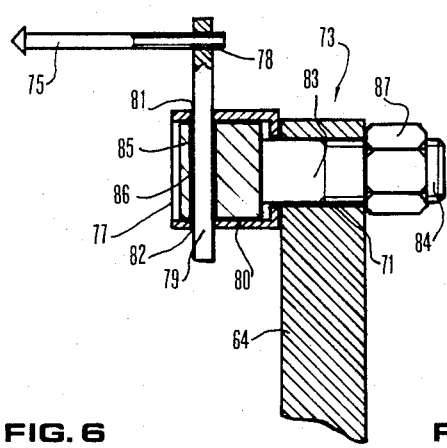
FIG. 6 is an enlarged section of a device for adjusting and securing a feeler, shown in an adjustment condition different from that of FIG. 4.

Arms 62 and 64 define, in proximity of their relevant free ends, through holes—one of which, 71, is better visible in FIG. 6—to which are fixed feeling devices 72 and 73 including feelers 74 and 75 and adjustment and fixing devices 76 and 77.

FIG. 6 shows in detail the feeling device 73 fixed to the relevant movable support or arm 64.

Feeler 75 has a threaded end that is adjustably coupled to a threaded through hole 78 defined by a substantially cylindrical elongated element 79. The coupling is obtained through a self-locking thread insert, not shown in the figure.

A first, substantially cylindrical, hollow element 80 defines on its side surface a pair of diametrally opposite holes 81 and 82. A second, substantially cylindrical elongated element 83 has a threaded end 84 and another end 85 with enlarged cross-section, that defines a diametral through hole 86. Element 83 is arranged within element 80 in such a way that the pair of holes 81 and 82 and the through hole 86 are aligned along a same diametral axis of elements 80 and 83. Elongated element 79 is arranged within elements 80 and 83 through the pair of holes 81, 82 and the through hole 86, while the threaded end 84 of the second element 83 passes through arm 64 via the through hole 71 and cooperates with a threaded element or nut 87 for fastening and adjusting the whole feeling device 73. In fact, as can be seen from FIG. 6, the locking action of nut 87 onto threaded end 84 and the abutment of the first hollow element 80 against arm 64 urge the second element 83 to slide within hollow element 80, thus offsetting through hole 86 with respect to the pair of holes 81, 82.

In this way, elongated element 79 receives a force adapted to keep it in position.

By loosening the coupling between threaded element 87 and end 84, elongated element 79 is rendered free to translate along its axis or to rotate about both its axis and, together with elements 80 and 83, the longitudinal axis of said elements 80 and 83.

In particular, by combining these movements, it is possible to adjust the position of feeler 75 (and similarly that of feeler 74) along the direction perpendicular to the plane of FIGS. 5 and 6, while maintaining feelers 74 and 75 aligned with feeler 70.

Three removable elongated members are fixed—through screws 90—to the support portion 61 of integral member 60, and are arranged parallel to movable arms 62, 63, 74 and facing them on opposite sides of the plane defined by the axes of the pair of screws 8; only one of the members, 94, is visible in FIG. 5 while another is denoted by reference sign 92 in FIG. 1.

Between each elongated element and the relevant movable arm is arranged a detecting device constituted by a position transducer of the differential transformer type, comprised of two parts.

Referring in particular to FIG. 5, transducer 95 comprises a first part consisting of a core supported by a stem 96 adjustably fixed to a threaded hole 98 of arm 64, and a second part consisting of a winding 97 fixed to elongated element 94.

The contact of feeling device 73, in particular that of feeler 75 against the part to be checked 13 causes a rotation of the same feeling device, and thus of arm 64, about the axis defined by lightened section 67. This movement is detected by transducer 95, that transmits an electric signal, through cables not shown in the figure, to an electric unit, not shown. The electric unit, by combining the signals of the pairs of transducers associated with opposite movable arms, is capable of determining the deviations of three diameters with respect to the nominal value.

Since the checkings involved are of comparative type, the displacements of feelers 70, 74 and 75 are small and the defomations of portions 65, 66, 67 are of elastic type. These deformations provide the return forces for movable arms 62, 63 and 64. Possibly, the return forces can also be determined by suitable springs.

A mechanical limiting device comprises a threaded pin or stem 101, that passes through support portion 61 via a through hole and has an end engaged into a threaded hole of arm 64, none of these two holes being visible in the drawing. Two stop nuts 102, 103 are coupled to pin 101 on opposite sides with respect to support portion 61.

Pin 101, when arm 64 rotates about portion 67, rotates together with it and the contacts of nuts 102 and 103 against the sides of support element 61 limit the amount of these rotational displacements.

Visible in FIG. 4 are threaded holes 105 and 106, defined by arms 62 and 63, respectively, for the arrangement and the adjustment of the stems carrying the cores of the transducers associated with arms 62 and 63, in a way quite similar to that described for arm 64.

It is remarked that in FIG. 1 heads 6 and 7 are shown very schematically, for better clarity; thus it must be considered that for every head 6 and 7 the explanations made with reference to FIGS. 4, 5 and 6 are valid.

A head as that shown in FIGS. 4 and 5 is manufactured from a single block of material in which at first, through a single machining operation, there is obtained a portion with a section of reduced thickness, that defines an axis of mutual rotation for the other portions. Then, cuts are made in one of these other portions, in particular two cuts for the head shown in the figure. The cuts are perpendicular to the axis of rotation and also concern the portion of reduced thickness, thus obtaining the movable arms and the relevant fulcrums.

The alignment between the arms and the fulcrums is therefore automatically obtained and the operation for fixing the head to structures of gauges, for example of the type shown in FIG. 1, is rendered very simple and quick.

In fact, the conventional technique was based on the use of several separate heads, each including a fixed part, a movable arm carrying the feeler and a part constituting the fulcrum. During the assembling plase of the distinct heads—for example in this case, three heads—it was consequently necessary to seek for a very accurate while not easy alignment between the arms and the relevant fulcrums, this being rendered even more complex and time consuming by the separate fixing of the distinct heads, each of which involved, for example, the use of two screws. The mounting of a head according to the invention is, on the contrary, very quick and simple, because it is not necessary to seek for the alignment of the different fulcrums—that, moreover, is very precise—and because two screws, for example, are sufficient for fixing the whole set including three arms and three fulcrums.

Moreover, the economical advantage of replacing three heads by one head only and the better sturdiness and handling of the device thus obtained have to be considered.

According to the particular embodiment shown in the drawing, the "stationary" part of the position transducers is coupled to removable members or portions secured to the support portion of the integral member. This, as well as the feature that the "movable" part, too, of the transducers is removably fixed to the relevant arm, provides some advantages with respect to the solution that would be obtained by coupling the "stationary" part of the transducers directly to the integral member.

In fact, by rendering the transducers very independent from one another, the assembling and replacement operations, in case of failure of the same transducers, are rendered simpler. Moreover, if only two feelers are used, and therefore only two movable arms are operative, it is not necessary to employ three transducers and accordingly it is possible to secure only two removable parts to the integral member, with the consequent economical advantage. Thus, it is available a particularly cheap and sturdy basic structure to which the transducer elements can be coupled as necessary.

It must be considered, too, that the whole head can also be used as go not-go device or as contact-detecting device, whenever suitable switching devices are replaced for the transducer means, i.e. the position transducers.

Moreover, it is pointed out that the whole gauge of FIG. 1 is particularly flexible, due to the described possibilities of adjusting the feelers and the Vee reference device, thus permitting checkings in a broad range, with excellent repeatability, reliability and reduced overall dimensions.

Moreover, the possibility of adjusting the guide and protection devices, too, brings about a better accuracy and sturdiness of the gauge.

Finally, it must be considered that another possible embodiment of a snap gauge according to the present invention can foresee a single integral member with three movable feeler elements, stationary abutments arranged in positions diametrically opposite to the feelers, with respect to the part to be checked, and reference means for the part including, for example, an adjustable plate.

What is claimed is:

1. Head for checking dimensions of mechanical parts comprising:

an integral member including a support portion, a plurality of resiliently flexible portions defining relevant fulcrums aligned along a single axis of rotation, and movable arms connected to the support portion through the resiliently flexible portions, the movable arms being rotatable, independently from one another, about said axis of rotation;

feelers fixed to the movable arms for contacting the part to be checked, at least one of the feelers being adjustable for changing the mutual distance of the feelers and arranging all of the feelers substantially aligned along a geometrical axis parallel to said single axis of rotation; and detecting devices for generating signals responsive to the displacements of the movable arms.

2. The head according to claim 1, wherein said movable arms have substantially elongated shapes and define, in rest condition, substantially parallel and coplanar longitudinal axes.

3. The head according to claim 1, wherein said feelers are removably fixed to the movable arms and said detecting devices comprise a plurality of electrical transducers, each having a first part and a second part mutually movable, the first part being removably secured to a relevant movable arm and the second part being removably secured to said support portion.

4. The head according to claim 1, wherein said integral member has substantially a U-shape, one leg and the base of the U defining said support portion, the second leg of the U defining at least one cut perpendicular to said axis of rotation for defining said movable arms.

5. The head according to claim 4, wherein the second leg of the U comprises said plurality of resiliently flexible portions, these portions being separated from each other by said cut.

6. The head according to claim 5, wherein said base of the U defines holes for fixing the head to an external support.

7. The head according to claim 1, further including a plurality of mechanical limiting devices cooperating with said support portion and said movable arms, for limiting said displacements of the movable arms.

8. The head according to claim 4, further including a plurality of mechanical limiting devices, each limiting device including a stem having an end fixed to one of the legs of said U and two stop elements fixed to the stem for cooperating with the other leg of said U and limiting clockwise and counterclockwise displacements of a relevant measuring arm.

9. The head according to claim 4, wherein the stop elements of said limiting devices are adjustably coupled to the relevant stems and are adjustable independently from one another.

10. Head for checking dimensions of mechanical parts comprising:

an integral member including a support portion, a plurality of resiliently flexible portions defining relevant fulcrums aligned along a single axis of rotation, movable arms connected to the support portion through the resiliently flexible portions, said movable arms being rotatable, independently from one another, about said axis of rotation, having substantially elongated shapes and defining, in rest condition, substantially parallel and coplanar longitudinal axes;

feelers fixed to the movable arms for contacting the part to be checked;

detecting devices for generating signals responsive to the displacements of the movable arms; and at least one adjustment and fixing device for fixing one of said feelers in proximity of the free end of the relevant movable arm, in a way adjustable along any spatial direction.

11. The head according to claim 10, wherein said adjustment and fixing device includes a first hollow element having a side surface defining a pair of holes aligned along a transversal axis, a second element—partially arranged within the first element—defining a threaded end and a through hole aligned along the same transversal axis, an elongated element—carrying the feeler—arranged within said pair of holes and said through hole and a threaded element adapted to cooperate with said threaded end for securing the feeler to the movable arm and for contemporaneously locking the elongated element.

12. Apparatus for checking dimensions of a mechanical part, comprising: support means; gauging heads fixed to the support means and having feelers adapted to contact the part and transducer means adapted to provide electrical signals; protection means; and reference means for the part to be checked at least one of the gauging heads comprising an integral member defining a support portion, a plurality of movable arms to which are fixed relevant feelers and a plurality of resiliently flexible portions aligned along a direction and defining a single rotation axis for independent rotational displacements of the movable arms, at least one of said feelers being continuously adjustable to arrange all of the feelers substantially aligned along a geometrical axis parallel to said single rotation axis, while changing the mutual distance of the feelers.

13. Apparatus for checking dimensions of a mechanical part, comprising: support means; reference means for the part to be checked comprising a Vee reference device adapted to define a longitudinal geometric axis; two gauging heads fixed to the support means and having feelers adapted to contact the part and transducer means adapted to provide electrical signals, each gauging head comprising an integral member defining a support portion, three movable arms to which are fixed relevant feelers and three resiliently flexible portions aligned along a direction and defining a single rotation axis for independent rotational displacements of the three movable arms, the integral members being arranged on opposite sides with respect to said longitudinal geometric axis, and the feelers are adjustable along a direction parallel to the axis of rotation defined by the relevant integral member.

14. The apparatus according to claim 13, further including connection means adapted to couple the Vee reference device to the support means in a way adjustable along said longitudinal axis, said Vee device comprising two distinct elements and adjusting means for securing said distinct elements in a way adjustable along a direction parallel to said axis of rotation.

15. The apparatus according to claim 14, wherein said protection means comprises guide and protection devices and fastening means for securing the guide and protection devices to the support means in a way adjustable along a direction perpendicualr with respect to said geometric axis, the fastening means also permitting adjustment of the dimensions of the guide devices along directions parallel to said axis of rotation.

16. The apparatus according to claim 15, wherein said fastening means comprise clamping elements, first fixing surfaces and second fixing surfaces, the first and second fixing surfaces defining grooved portions, the clamping elements being adapted to clamp said first fixing surfaces to said second fixing surfaces, said grooved portions being adapted to cooperate for preventing mutual displacements of said first and second fixing surfaces.

17. The apparatus according to claim 13, wherein said protection means comprise a first element for external protection, a second element for internal protection, a third and a fourth element for lateral protection, the first and the second protection elements being substantially U-shaped.

* * * * *